United States Patent Office 2,808,985
Patented Oct. 8, 1957

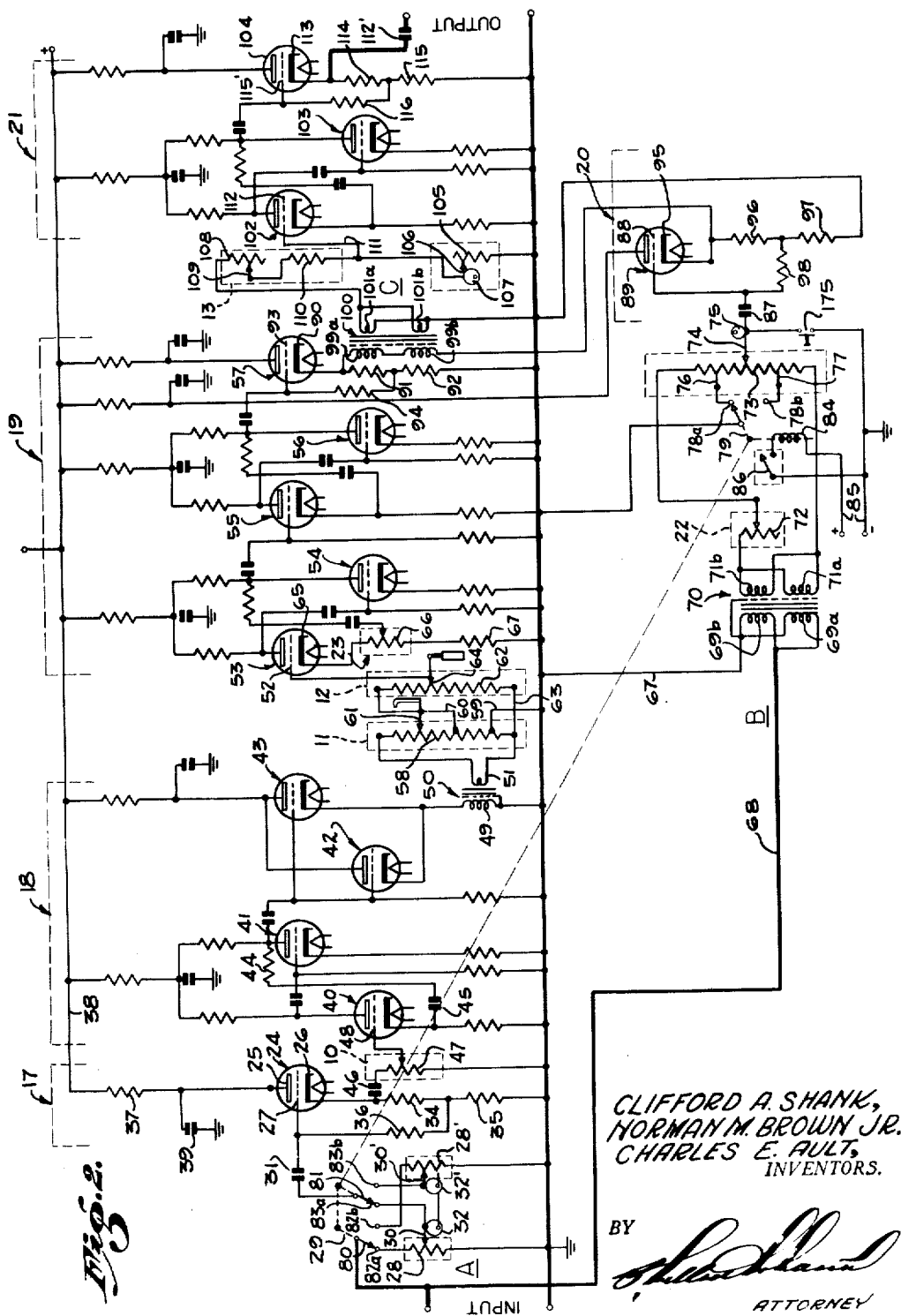

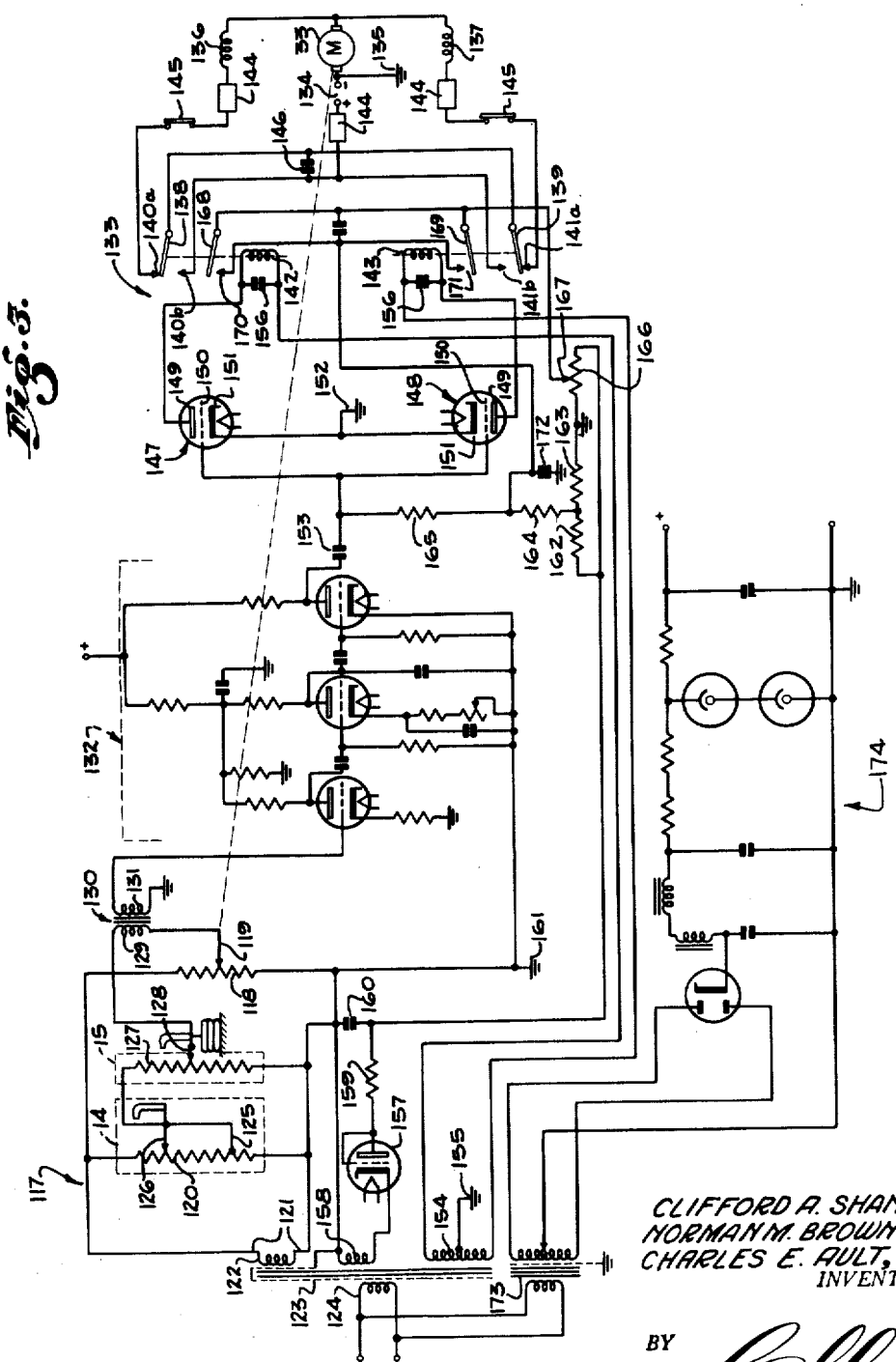

2,808,985

ANGLE OF ATTACK COMPUTER

Clifford A. Shank, Redondo Beach, and Norman M. Brown, Jr., and Charles E. Ault, Los Angeles, Calif., assignors to The Garrett Corporation, Los Angeles, Calif., a corporation of California Application July 30, 1951, Serial No. 239,332

11 Claims. (Cl. 235—61)

The present invention relates generally to computers, and is more specifically concerned with an electronic computer of the analogue type as distinguished from a computer of the digital type.

The present invention is susceptible of general application and use, under circumstances where it may be desired to continuously modify a received uncorrected input signal in accordance with predetermined constant and/or variable factors in order to produce a usable corrected output signal which will be continuously available.

Such a computer is especially useful in connection with aircraft, and by utilizing a stable oscillator input signal and applying essential flight factors, indications may be obtained which will enable the pilot to fly the aircraft most efficiently.

In the present instance, the invention is illustrated and described as being embodied in an angle of attack computer which indicates the angle of attack $\alpha FRL$; this being the angle between FRL, the fuselage reference line, and the direction of flight of the aircraft. The need for accurate measurement of the angle of attack has become of primary important with the development of automatic rocket and gun sighting equipment, and it is necessary to know $\alpha FRL$ for rocket ballistics considerations, in order to compute the target lead angle with the accuracy required for high speed aircraft.

With the foregoing in mind, considered in its general aspects, it is an object of the present invention to provide means by which the variables involved in the computation of an equation, such as the angle of attack, can be sensed and combined according to their proper mathematical relationship.

A further object is to provide an electronic analogue computer wherein variable and constant factors of the computation may be introduced as components of an electrical circuit, which in the case of certain variable factors are varied directly in proportion to changes in a sensed medium, while in others the variations are accomplished by the action of suitably designed cam surfaces or other means.

A still further object is to provide in an electronic analogue computer, novel means for selectively switching certain of the circuit components so as to correct for changes in the reference basis of the sensed media.

Another object is to provide novel means by which the electronic analogue computer of the present invention may be simply and quickly calibrated following replacement of parts, without having to remove it from its installed position.

Still another object is to provide a small lightweight computer suitable for aircraft, which is reliable and accurate in operation, and which avoids the disadvantages inherent in the servo-mechanism type of computer as usually constructed.

Briefly, the present invention comprises a plurality of associated electronic discharge devices and their control circuits for computing a desired mathematical equation, for example, the angle of attack $\alpha FRL$. An output signal from a radar unit is fed into the input of the computer where the voltage is modified according to the variables of the equation. The computer output voltage then become the radar signal corrected for the particular mathematical equation, in this case, the angle of attack.

In the case of a computer for determining the angle of attack, the instantaneous values of the variable factors of the equation, such as acceleration, weight, total pressure, and differential pressure are introduced into the computer circuits from suitable transducers which sense the variable media in terms of an electric circuit characteristic, such as resistance. Other factors of the equation, such as wing lift slope and zero lift coefficient are introduced into the circuits by means of potentiometers which are arranged to be varied as a function of Mach number or pressure ratio $Q_c/P_t$, where $Q_c$ is the differential pressure (total ram pressure $P_t$—static pressure $P_s$) and $P_t$ is the total ram pressure. These potentiometers are actuated by cam members having cam surfaces designed to conform to the curves for wing lift slope and zero lift coefficient as respectively plotted as a function of Mach number or the pressure ratio. The pressure ratio is sensed by suitable transducers in a servo-computing circuit which controls an actuator for rotatively driving the respective cam members.

Further objects of the invention will be brought out in the following part of the specification, wherein detailed description is for the purpose of fully disclosing the invention without placing limitations thereon.

Referring to the accompanying drawings, which are for illustrative purposes only:

Fig. 2 is a view schematically illustrating the devices and circuit connections of one part of the computer of the present invention; and Fig. 3 is a view schematically illustrating the electronic devices and circuit arrangement of the servo-unit forming a part of the present invention.

Figure 1:
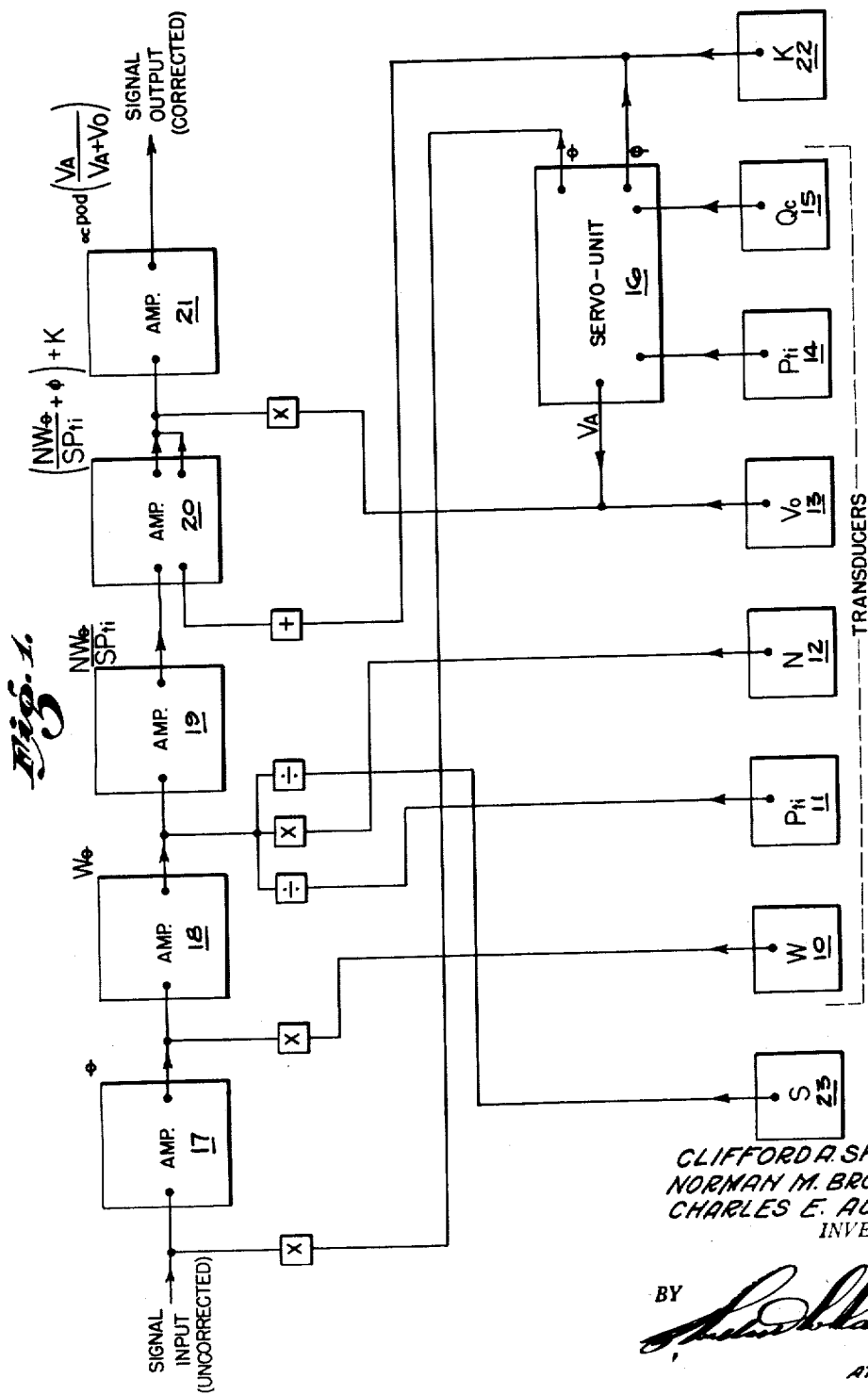
Fig. 1 is a block diagram illustrating one mathematical sequence in which the factors are introduced for solving the angle of attack equation in the computer of the present invention.

For illustrative purposes, the computer of the present invention is considered herein as being utilized to solve the aerodynamic equation for angle of attack, namely, $\alpha FRL$, which may be expressed as follows:

$$\alpha FRL = \frac{WN\theta}{SP_{ii}} + \Phi$$

or:

$$\alpha pod = \frac{WN\theta}{SP_{ii}} + \phi + K$$

where:

$\alpha FRL$ = Angle between FRL and the direction of flight
$\alpha pod$ = Angle between ℄ of pod and the direction of flight
$W$ = Airplane weight at time of computation in lb.
$N$ = Acceleration normal to the FRL (G's)
$S$ = Wing area (ft.²)
$P_{tt}$ = indicated total ram pressure lb./ft.³
$\theta$ — wing lift slope as a function of Mach number or pressure ratio
$\phi$ = zero lift coefficient as a function of Mach number or pressure ratio
$K$ = a fixed angle between $\alpha FRL$ and ℄ of rocket pod (degrees)

It will be observed in the above statement of the equation, that the factors $\theta$ and $\phi$ are expressed as functions of the Mach number, which is the ratio of the aircraft speed to the speed of sound, or as a function of the pressure ratio $Q_c/P_{tt}$. The manner in which these factors are obtained will be subsequently described.

While the above noted equation includes the usual variable factors necessary for correcting the incoming signal, there are occasions when it is desirable to introduce additional temperature corrective factors, for example, temperature corrections and true air speed corrections as affecting muzzle velocity in the case of the firing of rockets. The muzzle velocity correction is included by multiplying the computed angle for αpod (αFRL+K) by the factor $$\frac{V_A}{V_A+V_O}$$

where $V_A$ is the true air speed, and $V_O$ is muzzle velocity as determined by temperature of rocket.

As shown in the block diagram of Fig. 1, a plurality of transducers 10 to 15 inclusive are utilized to sense the variable instantaneous values of W, $P_{tt}$, N, $Q_c$ and $V_O$. Transducers 14 and 15 introduce the pressure $P_{tt}$ and differential pressure $Q_c$ into a servo-computing circuit 16 so that the actuator of the servo-unit will be controlled according to the Mach number or pressure ratio $Q_c/P_{tt}$. The actuator, as will hereafter be explained more fully, is utilized to vary suitable potentiometers as a function of the pressure ratio so as to provide the factors θ, P, and $V_A$.

The uncorrected signal is introduced into an electronically modulated circuit containing a plurality of amplifier sections, indicated by the numerals 17 to 21 inclusive, in coupled relation, the variable factors of the angle of attack equation being introduced into this circuit in the form of resistance characteristics in accordance with the mathematical relationship of the variable factors of the equation. The factor K as indicated by the numeral 22 is combined with the factor φ, and these factors are mathematically introduced into the signal circuit through an amplifier 20 to give a signal at this point which represents either the angle of attack αFRL or αpod depending upon whether the factor K is added.

For adding the muzzle velocity correction, αpod is corrected by multiplying it by the factor $$\frac{V_A}{V_A+V_O}$$

As shown, $V_A$ is obtained as a function of the pressure ratio from the servo-unit and is combined with $V_O$ from a suitable transducer and supplied to the circuit and amplified by the amplifier section 21 so that we now have a fully corrected signal output. The factor S comprises a variable potentiometer as indicated at 23.

The electronic circuits, their interconnection and the manner in which the factors of the equation to be computed are introduced, will now be described. Referring to Fig. 2, it will be noted that the arrangement embodies generally a pair of input circuits A and B which are respectively connected to receive an input signal, this pair of circuits being connected to a common output circuit C from which the signal corrected according to the equation is available for use.

The input circuit A embodies the amplifier sections 17, 18 and 19, respectively, which are successively coupled, the signal passing therethrough being modified in accordance with the values of variable circuit characteristics, such as a resistance characteristic, in accordance with the mathematical relationship of the variable media involved in the equation to be computed. The amplifier section 17 consists of a triode electron tube 24 having a plate anode 25, a cathode 26 and control grid 27. The grid 27 of this tube is arranged to be controlled by the input signal as modified by variations in potentiometers 28 and 28' which are arranged to be selectively connected by a suitable switch 29 across the input circuit with the movable contact 30 or 30', as the case may be, connected through a coupling condenser 31 with the grid 27. The movable contacts of the potentiometers 28 and 28' are respectively varied by means of suitable cam members 32 and 32', respectively, which are driven from an actuator motor 33 (Fig. 3) of the servo-unit 16 which is controlled in response to a sensed medium in a manner which will hereinafter be explained in detail. The potentiometers 28 and 28' correspond with different values of the factor θ, so as to compensate for changes in conditions due to the use or non-use of wing-tip tanks; and the cams 32 and 32' have cam surfaces designed to properly vary this factor as a function of the sensed medium.

The cathode 26 is connected through a grid bias resistor 34 and a cathode load resistor 35 to the grounded side of the circuit, and the control grid 27 is connected through a grid return resistor 36 to the connection between resistors 34 and 35. The plate anode 25 is connected through a resistor 37 with conductor 38 which constitutes the positive side of the plate potential, and through a condenser 39 to ground, the resistor 37 and condenser 39 constituting a decoupling network.

The amplifier section 18 comprises generally four triode electron tubes 40, 41, 42 and 43 which are coupled in conventional manner, to give a negative feed back between tube 41 and tube 40 through a feed back resistor 44 and feed back condenser 45.

The amplifier section 17 is coupled with the amplifier section 18 by utilizing a cathode follower connection, the cathode 26 of tube 24 being connected through a coupling condenser 46, a potentiometer 47 constituting a part of transducer 10, and thence to a control grid 48 of electron tube 40. The utilization of a cathode follower provides low impedance and prevents loading up of the circuit and minimizes distortion of the signal.

The potentiometer 47 is arranged to be varied as the weight factor of the equation changes due to fuel consumption, dropping of rockets, etc. By connecting one end of the potentiometer 47 to the condenser 46 and the other end to ground, with the variable contact connected to the grid 48, the action in the circuit is to multiply the weight factor times the factor θ.

The tubes 42 and 43 are parallel connected, having their cathodes connected through primary side 49 of a step-down coupling transformer 50 to the ground side of the circuit, the secondary side 51 being connected through a coupling circuit containing transducers 11 and 12 with a control grid 52 of a triode electron tube 53 which is conventionally coupled with electron tubes 54, 55, 56 and 57 to form the amplifying section 19 in which negative feed back is employed for obtaining stability with gain.

The transformer 50 constitutes a cathode follower. The secondary winding 51 of the transformer is connected across a potentiometer 58 having tap which is connected by a conductor 59 with the ground side of the circuit, and an intermediate tap which is connected by conductor 60 with a movable contact 61 adapted to be varied in response to variations of total indicated ram pressure, the conductor 60 likewise being connected to one end of a potentiometer 62 having its other end connected with the corresponding end of potentiometer 58 by a conductor 63. This potentiometer has a movable contact 64 which is connected to the control grid 52 and is adapted to be varied in accordance with variations in the factor N of the equation. In other words, the transducer 12 senses changes in acceleration normal to the fuselage reference line. Interconnecting the potentiometers 58 and 62 in the manner just described, the mathematical result is to multiply by the factor N in the equation and divide by the factor $P_{tt}$.

Mathematically, an additional factor is introduced for further correction of the signal at this point, namely, the introduction of the factor S into the equation by a division process. This is accomplished by connecting a cathode 65 of tube 53 through a potentiometer 66 and cathode resistor 67 to the ground side of the circuit. This potentiometer has a movable contact which is connected into a negative feed back circuit from the tube 54 to the tube 53.

In order to complete the computation of the angle of attack, it is now necessary to add the additional factor $\phi$; and, if the angle of the rocket pod is required, the factor K must also be added. The computation of these factors is electronically performed in the other input circuit B, which will now be described.

The signal input to circuit B is through conductors 67 and 68 which connect with primary windings 69a and 69b of transformer 70, these windings being electrically connected in parallel. Secondary windings 71a and 71b of this transformer are connected through a variable series resistor 72, which comprises a K factor 22, across a bridging potentiometer 73 corresponding to the factor $\phi$ of the equation. The potentiometer has a movable contact 74 arranged to be varied by means of a cam member 75 having a driving connection with the actuator motor 33 (Fig. 3) of the servo-unit 16.

In order to shift the operational curve of the factor $\phi$ in accordance with the value of the factor $\theta$ as determined by the selection of potentiometer 28 or 28', the potentiometer 73 is provided with tap connections 76 and 77 which are brought out to switch contacts 78a and 78b which are selectively associated with a movable contact 79. The contact 79 is connected for gang operation with movable contacts 80 and 81 of switch 29 which are selectively associated with contacts 82a, 82b and contacts 83a, 83b for selectively connecting the potentiometers 28 and 28' into the circuit as previously explained.

Actuation of contacts 79, 80 and 81 is accomplished by means of a solenoid having an operating coil 84 connected with a source of low voltage operating current 85 through a control switch 86.

The movable contact 74 of the potentiometer 73 is capacity coupled by means of a condenser 87 with a control grid 88 of a triode electron tube 89 of the previously mentioned amplifier 20.

The input circuits A and B are interconnected so that the outputs of tubes 57 and 89 will be algebraically combined so as to give the angle of attack under those conditions where further correction is unnecessary. The interconnection of circuits A and B at this point is accomplished by providing cathode follower connections with each of the tubes 57 and 89. The tube 57 has a cathode 90 which is connected through a grid bias resistor 91 and a cathode load resistor 92 to the grounded side of the circuit. For controlling tube 57, a control grid 93 thereof is connected through a grid return resistor 94 to the connection between resistors 91 and 92.

Tube 89 has a cathode 95 which is connected through a grid bias resistor 96 and a cathode load resistor 97 to the grounded side of the circuit, the control grid 88 being connected through a grid return resistor 98 to the connection between resistors 96 and 97.

The cathodes 90 and 95 are interconnected through series connected primary windings 99a and 99b of coupling transformer 100, secondary windings 101a and 101b of this transformer being connected in parallel and constituting the input to the common output circuit C which makes up the amplifier 21 and has triode electron tubes 102, 103 and 104 conventionally connected with a negative feed back connection between tubes 103 and 102.

Provision is made in the coupling circuit of the input to tube 102 for introducing the factor $$\frac{V_A}{V_A+V_O}$$

This is accomplished by connecting the secondary of transformer 100 across a bridging rheostat 105 having a movable contact 106 arranged to be operated by a cam 107 having a cam surface predesigned to properly vary this rheostat, which represents true air speed, as a function of a sensed medium, the cam being operable by the actuator motor 33 (Fig. 3) of the servo-unit 16.

The transducer 13 representing the factor $V_O$ is connected in series in one side of the circuit from the transformer secondary to the bridging rheostat, this transducer comprising a rheostat 108 connected at one end to one side of the transformer circuit and having a movable contact 109, the position of which represents the temperature of the rockets, this contact being connected through a series resistor 110 with the movable contact 106 of rheostat 105. The movable contact 106 is connected through a conductor 111 with a control grid 112 of tube 102.

The output of the common circuit C consists of a cathode follower connection which is coupled through a coupling condenser 112'. Tube 104 has its cathode 113 connected through a grid bias resistor 114 and a cathode load resistor 115 to the grounded side of the circuit, and its grid 115' connected through a grid return resistor 116 to the interconnection between resistors 114 and 115.

Referring now to Fig. 3, the computing circuit of the servo-unit 16 will now be described. The direction of rotation and extent thereof of the actuator motor 33 is controlled from a bridge circuit 117 in which transducers 14 and 15 are interconnected to form the servo-positioner, and a potentiometer 118 forms a servo follow-up, this potentiometer having a movable contact 119 which is actuated by the motor 33.

As shown, the transducer 14 comprises a potentiometer 120 having its ends connected across a bridge input circuit 121 connected to the secondary winding 122 of a power supply transformer 123 having a primary winding 124 connected to a suitable source of supply. The potentiometer 120 has a tap 125 which is connected to a movable contact 126 for adjusting the potentiometer. The movable contact 126 has a connection with one end of a potentiometer 127 which is connected at its other end to the grounded side of the bridge input circuit. The potentiometer 127 has a movable contact 128 by means of which its value may be varied.

The movable contact 126 is arranged to be responsive to variations in total ram pressure, while the movable contact 128 is arranged to be responsive to differential pressure. With the potentiometers connected as shown, these potentiometers mathematically combine to form a bridge resistance which is varied in accordance with the Mach number or pressure ratio $Q_c/P_{ti}$.

The output of the bridge circuit is through the movable contacts 119 and 128 and includes the primary winding 129 of a transformer 130 having its secondary winding 131 connected to the grid control circuit of a conventional three stage amplifier as generally indicated by the numeral 132.

The direction and extent of rotation of the actuator motor 33 is controlled by means of a triggering circuit, as generally indicated by the numeral 133, depending upon the amount and direction of unbalance of the bridge circuit 117. The motor 33 has one of its terminals connected to one side of an appropriate energy source 134 which is preferably grounded as indicated by the numeral 135. The other terminal of the motor is connected through selective circuits containing field coils or windings 136 and 137 for operating the motor in opposite directions of rotation, these windings being normally connected into a closed circuit by means of relay switches 138 and 139 which engage contacts 140a and 141a respectively.

The switches 138 and 139 are selectively operable by means of energizable windings 142 and 143 which are controlled by the triggering circuit, as will hereinafter be described. Energization of the winding 142 actuates the switch 138 so as to cause it to disengage from contact 140a and engage contact 140b, and similarly energization of winding 143 will operate to disengage the switch 139 from contact 141a and engage contact 141b. It will therefore be apparent that by selectively energizing the windings 142 and 143, the motor field windings may be selectively connected through contact 140b or contact 141b with the opposite side of the energy source 134. With this arrangement, the energizing circuits of the motor field windings 136 and 137 are interlocked electrically through the switches 138 and 139, so that these windings cannot be energized simultaneously, and if one of the windings is energized, any attempt to reverse the motor 33 by energizing its other field winding, will result in a disconnection of the already energized field winding and the motor will under such circumstances not operate in either direction.

Radio noise filters 144 are placed in the energizing circuits of the motor field windings, as well as suitable limit switches 145—145 for protective purposes. A radio noise suppressing condenser 146 is connected between the switches 138 and 139 and their respective contacts 140b and 141b.

Considering now the triggering circuit 133 in more detail, this circuit includes two triode tubes 147 and 148, although it will be understood that a duo-triode may be employed as is well known in the art. Each of the tubes 147 and 148 has a conventional plate 149, control grid 150 and cathode 151. The cathodes 151 are interconnected and grounded at 152. The control grids 150 are interconnected and have a common connection with the output circuit of amplifier 132 through a coupling condenser 153. The plates 149 of the tubes 147 and 148 are interconnected through a series circuit containing relay windings 142 and 143, and a secondary transformer winding 154 of transformer 123, the winding 154 having a mid-tap grounded as indicated at 155. Each of the relay windings 142 and 143 has a bridging condenser 156 connected across its terminals. It will be noted that the primary winding of the transformer 123 supplies energy to secondary windings which are connected respectively to the bridging circuit 117 and to the plate circuit of the triggering circuit. With this arrangement, the bridging circuit and plate circuits are supplied with alternating potentials which are preferably in phase, although these potentials may be 180° out of phase.

Considering now the operation of the triggering circuit 133, as thus far described, it will be apparent, in connection with tubes 147 and 148, that one of the plates 149 will have a supplied alternating potential which is 180° out of phase with that which is supplied to the other plate 149, whereas the potential of the alternating signal supplied to both the grids 150 may be in phase with that on either one or the other of the plates 149, or will be zero. The phase relationship will depend upon the relative positions of the movable contacts 119, 126 and 128 with respect to the potentiometers 118, 120 and 127, that is, upon the direction of bridge unbalance.

Thus, if the bridge circuit is unbalanced in a direction such that the output signal voltage applied to the grids 150 is in phase with that appearing at the plate of tube 147 and out of phase with the voltage appearing at the plate of tube 148, an energizing current will flow in winding 142. Switch 138 will then be actuated to closed position and energize the field winding 137 of motor 33 which now operates in a direction to move the contact 119 in a direction to restore the bridge balance.

When the bridge is unbalanced in an opposite direction from that stated above, the phase relationship of the signal voltage will be reversed so that it is now in phase with that appearing at the plate of tube 148 and out of phase with that appearing at the plate of tube 147. In such event, an energizing current will flow in winding 143 and actuate switch 139 to closed position. This will energize field winding 136 of motor 33 which will now operate in a reverse direction and move contact 119 in an opposite direction to restore bridge balance.

Upon movement of contact 119 to a position in which the bridge is electrically balanced, there will be no current flow from its output circuit into the winding 129 of transformer 130, and thus there will be no signal applied to either of the grids 150 of tubes 147 and 148. Under such condition and with a fixed negative bias on the grids as will hereinafter be discussed, the current which normally flows in the plate circuits of tubes 147 and 148 through windings 142 and 143 will be insufficient to actuate the switches 138 and 139, or maintain them in a previously closed position.

In summarizing, it will be seen that, when the bridge circuit is unbalanced in one direction, the triggering circuit energizes the reversible motor in one direction, and when the direction of unbalance of a bridge circuit is reversed, the direction of energization of the motor is likewise reversed.

A negative potential source for biasing the grids may conveniently be obtained from a triode tube 157 which is connected into one side of a supply circuit from a secondary winding 158 of transformer 123. The plate and grid of tube 157 are interconnected so that this tube acts as a half-wave rectifier, the plate being connected through a resistor 159 to one side of a condenser 160 having its other side connected to the other side of the circuit from the transformer secondary winding 158, and preferably grounded as indicated at 161.

The output circuit potential across the condenser 160 is applied across a voltage divider consisting of resistors 162 and 163 which are connected in series and have their common terminal connected through a resistor 164 and an isolating resistor 165 to the grids 150 of the tubes 147 and 148.

With this arrangement as thus far described, a fixed negative bias is applied to the grids of the tubes 147 and 148, this bias being of predetermined value and so chosen as to determine the amount of unbalance which must exist before sufficient current may be made to flow in the plate circuits to pick up and operate the switch relays for controlling the direction of rotation of the motor 33.

In order to prevent over-shifting and subsequent hunting of the control motor 33, the triggering circuit is arranged so that the motor will be pulsed in a step-by-step manner in its movement of contact 119 to bridge balancing position. For such purpose, means are provided for applying a modulating negative bias to the grids of the tubes 147 and 148, when either of the relay coils 142 or 143 is energized.

More specifically, a variable potentiometer 166 is also connected across the output circuit, this potentiometer having a variable contact 167 which is connected through parallel switches 168 and 169 arranged to be respectively actuated from normally open positions into engagement with associated contacts 170 or 171 upon the operation of the relays. The contacts 170 and 171 are connected with one side of a timing condenser 172 having its other side grounded, and connect also with the common terminal of resistors 164 and 165.

With the condenser 172 thus connected, it will normally receive a voltage charge through series resistor 164, but upon closing of either switch 168 or 169, an increased voltage will be placed across the condenser depending upon the adjustment of the movable contact 167 of potentiometer 166. The amount of resistance of this potentiometer, which is in series with the condenser 172, will constitute a resistor-condenser charging circuit having a time constant depending upon the values utilized for the condenser and potentiometer. Thus, after a time interval, determined by the time constant of the resistor-condenser circuit, the modulating negative bias will be applied to the grids of the tubes 147 and 148 to obtain pulsing operation of the motor 33 in a manner fully described in the application of Clifford A. Shank and Norman M. Brown, Jr., Serial No. 83,676, now forfeited, and entitled Electronic Temperature Regulator.

Briefly, in the present arrangement the modulating bias will oppose the applied signal potential resulting from an unbalance in the bridge circuit 117. This negative bias will gradually build up until ultimately the plate current will be reduced to a drop out value for the relay winding 142 or 143, as the case may be, unless the bridge unbalance is so great that a signal potential of greater magnitude than that of the negative bias is produced. It is characteristic of this biasing arrangement that the frequency and length of pulses are varied in proportion to the magnitude of the signal produced by unbalance of the bridge circuit. Hence, the bridge signal may reach a sufficiently high value to cause a "full on" condition in which the motor 33 will initially run continuously and thereafter with pulsing action until bridge balance is restored.

Drop out operation of either relay will deenergize the motor 33 and concurrently open the circuit through switch 168 or 169 as the case may be. The condenser 172 is thereupon connected into a resistor-condenser discharging time circuit in which the condenser discharges through resistor 164, and resistor 163 in parallel with resistors 162 and potentiometer 166. The negative bias applied to the grids thus bleeds off slowly through the network until the plate current again increases to a value sufficient to actuate the relay, thereby reestablishing the conditions prevailing previously. This sequence of operating pulses of the motor 33 continues until the movement of the movable contact 119 of the servo follow-up potentiometer 118 again establishes bridge balance. At the same time, the motor 33 will position cams 32 or 32', cam 107, and cam 75 as functions of variations in transducers 14 and 15 as a servo positioner.

Plate power supply for the circuits shown in Fig. 2, and the amplifier of the servo-unit is obtained from a source of alternating current which may be the same as that of transformer 123. A step-up transformer 173 has its primary connected to the alternating current source and a secondary which feeds a full wave rectifier and filtering circuit containing conventional voltage regulating tubes, all as generally indicated by the numeral 174, all of which is well known in the art and needs no detailed description.

In the design of the computing circuit shown in Fig. 2, the signal input impedance and the signal output impedance have been made the same, and in this instance have been designed so that the impedances are each of five thousand ohms.

The computer unit and system may be designed to have a desired scale factor. In the present embodiment, a scale factor is obtained in which each fifteen volt signal input will result in one volt output per degree of angle of attack.

Provision is made for calibration checks by providing a ground connection from the movable contact 74 of bridging potentiometer 73 under control of a normally open push button switch 175 as shown in Fig. 2. Closing of this switch acts to interconnect contact 79 and contact 74 which removes the factor $\phi$ from the circuit.

Although we have disclosed an exemplary embodiment of our invention herein for purposes of illustration, it will be understood that various changes, modifications and substitutions may be incorporated therein and we hereby reserve the right to all such changes, modifications and substitutions as properly come within the scope of the invention.

We claim:

1. An angle of attack computer, comprising: a pair of circuits having their inputs connected to a first signal source, and outputs connected to a common output circuit; a mechanically variable potentiometer respectively contained in each circuit of said pair and said output circuit; and servo means including an actuator for simultaneously actuating said potentiometers, said servo means being responsive to variations in a sensed medium and said potentiometers being variable as a function of said sensed medium.

2. An angle of attack computer, comprising: a pair of circuits connected to receive a supplied electrical signal; means for producing a second electrical signal; servo means controlled by said second electrical signal including an actuator; means operable by said actuator for varying an electrical characteristic of each circuit of said pair of circuits to modify the signal therein; and means for mathematically combining the outputs of said pair of circuits into an output electrical signal which has been correctively modified with respect to said supplied electrical signal.

3. In an angle of attack computer, the combination of: a first electric signal receiving circuit; signal modulating means in said circuit for correctively modifying said first signal; a bridge circuit containing variable potentiometers with movable contacts connected to an output circuit; certain of said potentiometers being responsive to sensed media and connected to mathematically represent a ratio of total pressure to a differential pressure, and another of said potentiometers being a follow-up bridge balancing potentiometer; and control means connected to said output circuit including an actuator for said follow-up potentiometer and said first signal modulating means.

4. In an angle of attack computer, the combination of: a first electric signal receiving circuit; signal modulating means in said circuit for correctively modifying said first signal; a bridge circuit containing variable potentiometers with movable contacts connected to an output circuit, one of said potentiometers being responsive to variations of a sensed medium and the other constituting a follow-up bridge balancing potentiometer; and control means connected to said output circuit including an actuator having driving connection with said follow-up potentiometer and said first signal modulating means.

5. Angle of attack computer apparatus, comprising: first and second circuits connected to receive a supplied electrical signal; a plurality of variable potentiometers in said first circuit responsive to variations in sensed media; a potentiometer in said second circuit variable as a function of variations in a sensed medium; means for mathematically combining the outputs of said first and second circuits; and means for short circuiting the potentiometer of said second circuit during calibrating operation.

6. Angle of attack computer apparatus, comprising: first and second circuits connected to receive a supplied electrical signal; a pair of variable bridging potentiometers associated with said first circuit and a variable bridging potentiometer in said second circuit having tap connections; means for varying said potentiometers in accordance with a sensed medium; and switching means for selectively connecting said pair of potentiometers in said first circuit and selectively connecting said taps of the potentiometer in the second circuit with ground.

7. An angle of attack computer, comprising: a first circuit having input and output connections, including means for introducing certain corrective factors into a signal supplied to its input connection; a second circuit having input and output connections coupled with the input and output connections of said first circuit, and including means for introducing certain other corrective factors into a signal supplied to its input connection; a third circuit having an input coupled to receive a combined corrected signal from the interconnected outputs of said first and second circuits, and including means for introducing certain additional corrective factors into the signal supplied to its input for delivery to its output as a corrected output signal; a servo circuit including an actuator operable in response to variations in the components constituting an aircraft Mach number; and means in each of said first, second and third circuits motivated by said actuator for respectively introducing corrective factors into said circuits, which are variable as a function of said Mach number.

8. An angle of attack computer comprising: a first circuit having input and output connections, and including means for introducing certain corrective factors into a signal supplied to its input connection; a second circuit having input and output connections respectively in common with the input and output connections of said first circuit, and including means for introducing certain other corrective factors into a signal supplied to its input connection; a servo circuit including an actuator operable in response to variations in the components constituting an aircraft Mach number; and means in each of said first and second circuits motivated by said actuator for respectively introducing corrective factors into said circuits, which are variable as a function of said Mach number.

9. An angle of attack computer for an aircraft, comprising: a pair of amplifying circuits having inputs connected to receive a signal from a common signal source and outputs connected to a common signal delivery circuit; means in said circuits for respectively introducing certain corrective factors into the signals therein, the corrected signals to be combined in the common delivery circuit; and a servo circuit including an actuator operable in response to variations in the ratio of the speed of said aircraft to the speed of sound; and means controlled by said actuator for introducing the factors of wing lift slope and zero lift coefficient, respectively, into said pair of circuits as functions of said ratio.

10. An angle of attack computer for an aircraft, comprising: a pair of amplifying circuits having inputs connected to receive a signal from a common signal source and outputs connected to a common signal delivery circuit; means in said circuits for respectively introducing certain corrective factors into the signals therein, the corrected signals to be combined in the common delivery circuit; and a servo circuit including an actuator operable in response to variations in the ratio of the speed of said aircraft to the speed of sound; and cam variable potentiometers respectively in said circuits mechanically operable by said actuator, said cams having cam surfaces formed to introduce into said circuits the factors of wing lift slope and zero lift coefficient for said aircraft as functions of said ratio.

11. Aircraft computer apparatus for evaluating $$\alpha FRL = \frac{WN\theta}{SP_u} + \phi$$

wherein W represents the aircraft weight, N the acceleration normal to FRL (G's), S the wing area, $P_{tt}$ the total ram pressure, and where $\Theta$ and $\Phi$ are respectively the wing lift slope and the lift coefficient expressed as a function of the aircraft Mach number, comprising: a pair of signal correcting circuits having a common signal receiving input and common signal delivery output, one of said circuits including a first variable potentiometer and the other of said circuits including a second variable potentiometer; a servo control circuit including an actuator operable in response to changes of said Mach number due to varying flight conditions; and cams operable by said actuator having surfaces for respectively varying said potentiometers in accordance with the factors $\Theta$ and $\Phi$ as functions of said Mach number.

References Cited in the file of this patent

UNITED STATES PATENTS

| | | |
|---|---|---|
| 1,597,323 | Massolle et al. | Aug. 24, 1926 |
| 1,986,986 | Swartwout | Jan. 8, 1935 |
| 2,399,726 | Doyle et al. | May 7, 1946 |
| 2,414,819 | Lakatos | Jan. 28, 1947 |
| 2,427,463 | Klemperer et al. | Sept. 16, 1947 |
| 2,448,698 | Biot et al. | Sept. 7, 1948 |
| 2,454,549 | Brown et al. | Nov. 23, 1948 |
| 2,503,213 | Philbrick | Apr. 4, 1950 |
| 2,587,919 | Straus et al. | Mar. 4, 1952 |
| 2,594,436 | Hornfeck et al. | Apr. 29, 1952 |

FOREIGN PATENTS

| | | |
|---|---|---|
| 45,249 | Denmark | Feb. 15, 1932 |

OTHER REFERENCES

Electronic Computers, William Shannon, "Electronics," August 1946, pp. 110–113.

Analysis of Problems in Dynamics by Electronic Circuits, J. R. Ragazzini et al., "Proceedings of the Institute of Radio Engineers," vol. 35, No. 5, May 1947; pp. 444–452.

Electrical Analogue Computing, parts 2 and 4; D. J. Mynall "Electronic Engineering," July and September 1947; pp. 214–217 and pp. 283–285.

Electronic Instruments, Greenwood et al., M. I. T. Radiation Lab. Series, vol. 21; McGraw-Hill 1948; Figures 14.2, 3.6 (a), relied upon.

UNITED STATES PATENT OFFICE
Certificate of Correction

Patent No. 2,808,985                                                    October 8, 1957

Clifford A. Shank et al.

It is hereby certified that error appears in the printed specification of the above numbered patent requiring correction and that the said Letters Patent should read as corrected below.

Column 3, line 27, for "factors $\theta$, P, and $V_A$" read —factors $\theta$, $\phi$, and $V_A$—.
Signed and sealed this 31st day of December 1957.

[SEAL]

Attest:
KARL H. AXLINE,
*Attesting Officer.*

ROBERT C. WATSON,
*Commissioner of Patents.*